June 16, 1964 M. J. JACOBSON ETAL 3,137,280
ROTARY ENGINE
Filed June 1, 1961 4 Sheets-Sheet 1

INVENTOR.
Melvin J. Jacobson
John R. Glodek
BY
ATTORNEY

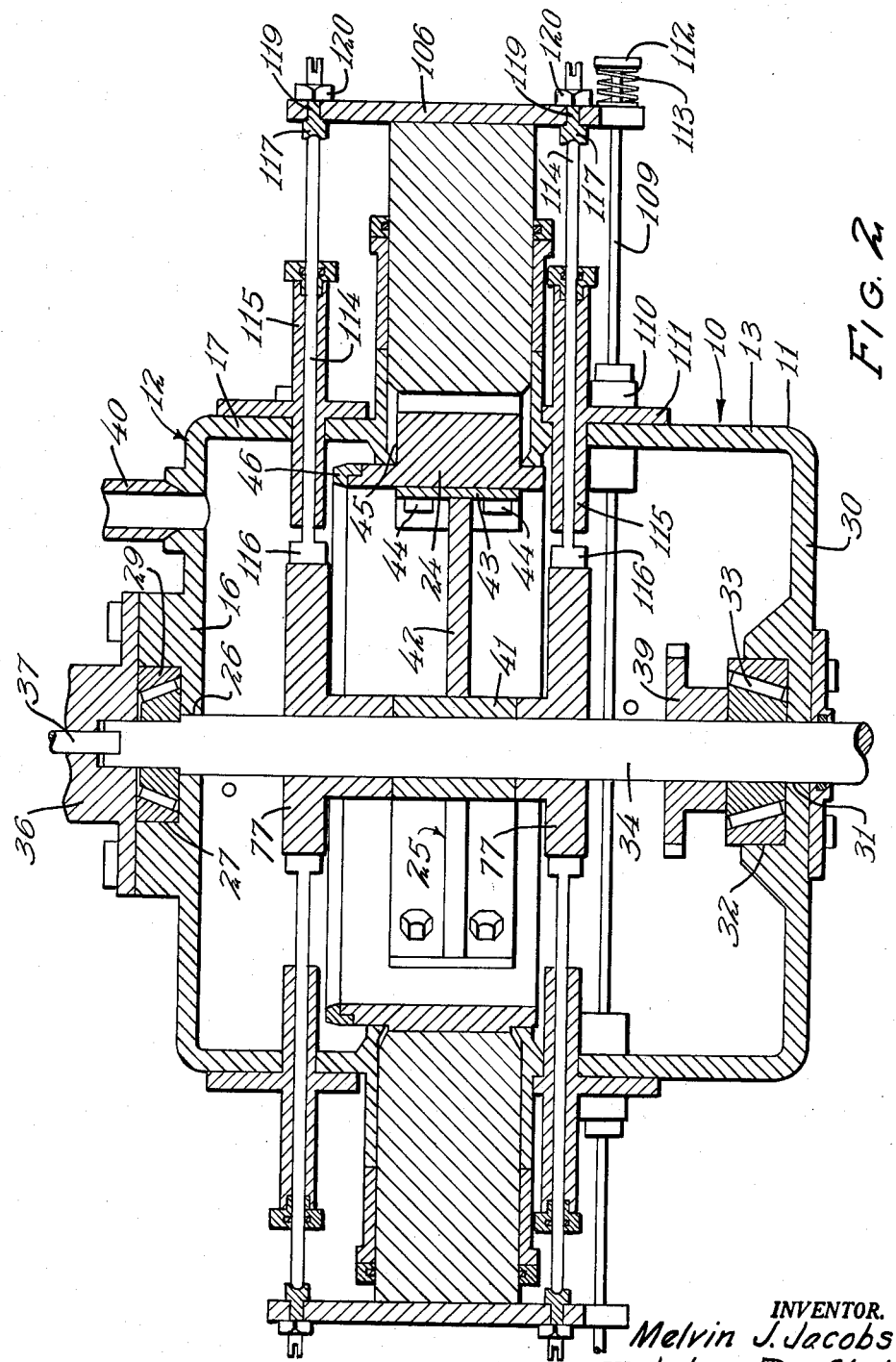

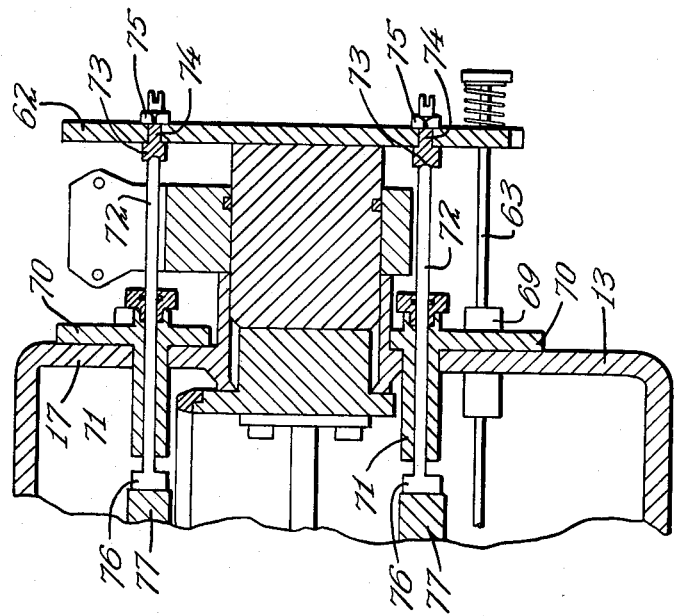
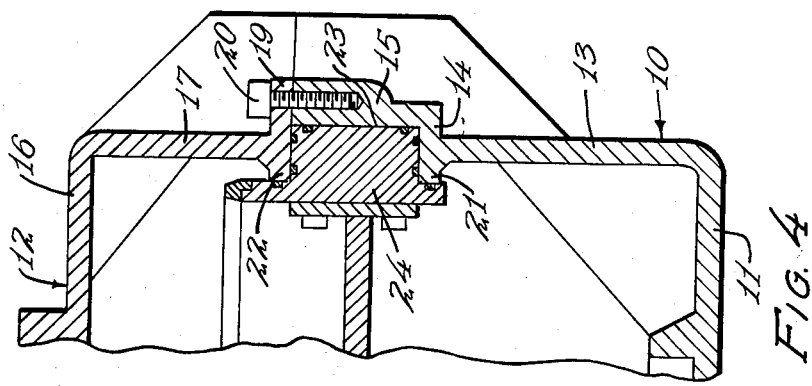

June 16, 1964  M. J. JACOBSON ETAL  3,137,280
ROTARY ENGINE

Filed June 1, 1961  4 Sheets-Sheet 4

INVENTOR.
Melvin J. Jacobson
John R. Glodek
BY Robert M. Dunning
ATTORNEY

United States Patent Office 3,137,280
Patented June 16, 1964

3,137,280
ROTARY ENGINE
Melvin J. Jacobson, 2901 32½ Ave. NE., and John R. Glodek, 3420 Cleveland St., both of Minneapolis, Minn.
Filed June 1, 1961, Ser. No. 114,087
16 Claims. (Cl. 123—14)

This invention relates to an improvement in rotary engine and deals particularly with an engine having a lobed rotor which is rotatable in a cylindrical housing.

An object of the present invention resides in the provision of a rotary engine preferably including a three-lobed rotor which is rotatable in a cylindrical housing. In the particular form of construction illustrated, the housing is provided with two diametrically opposed intake and exhaust port elements through which fuel may enter the housing and the exhaust may leave the housing. In substantially ninety degree relation to the intake and exhaust ports, compression chambers are provided in which the fuel may be compressed and ignited to cause rotation of the lobed rotor by action against the trailing edge of each lobe. Obviously, if a greater number of power strokes per revolution were required, the intake and exhaust ports could be located ninety degrees apart, and the compression chambers could be similarly provided spaced at ninety degrees and intermediate the intake and exhaust ports.

A feature of the present invention resides in the provision of an engine having radially slidable vanes, the inner ends of which are in sealed relation to the lobed rotor, and which act to separate the intake ports from the exhaust ports. These vanes are connected to move in unison or substantially so, one of the vanes moving outwardly toward the periphery of the lobes, while the other vane moves inwardly toward the base of the pocket between the lobes.

A further feature of the present invention resides in the provision of a motor of the type described having compression chambers which are divided into two sections by a pair of radially slidable vanes, which, in general, follow the contour of the lobed rotor during rotation thereof. The portions of the compression chambers on one side of the vanes and into which the fuel is compressed by rotation of the rotor is provided with a slidable piston normally held in projected position to reduce the cross sectional area of this section of the chamber, and which is yieldably supported to increase the cross-sectional size of the chamber section as the fuel is compressed therein. As the lobe rotates toward firing position, the vane separating the two sections of the chamber is moved out of contact with the rotor, permitting the compressed fuel to flow into the firing section of the compression chamber in which the fuel explosion takes place. Just before the fuel is ignited, the vane is returned into sealing relation with the rotor acting as an abutment to urge the rotor in one direction by the explosive force of the ignited fuel against the trailing edge of the rotor lobe.

A further feature of the present invention resides in the fact that the vanes dividing the compression chamber are resiliently connected together to move in unison so that throughout the major portion of the cycle of rotation, one vane will move outwardly while the other moves inwardly. A cam means is provided which is rotatable with the rotor shaft and which acts to move each vane out of engagement with the rotor surface at the desired point of rotation.

A further object of the present invention resides in the provision of a simple design which does not encompass complicated and highly accurate synchronization. The engine is constructed of a basic design which permits substantially unlimited variations to procure desired power and efficiency combinations.

An added feature of the present invention resides in the provision of an engine which may be made at low cost due to the small number of working parts, and which also be substantially trouble free for the same reason. The engine also has a low friction rating due to the manner in which it is constructed.

A further feature of the present invention lies in the fact that the entire engine requires a relatively small space for its rated horse power. The engine produces high torque at low rotative speed, and due to its rotary mounting, it would provide an extremely smooth and steady power. The engine is also relatively free of vibration.

In the drawings forming a part of the specification:

FIGURE 2 is a sectional view through the engine at right angles to FIGURE 1, the position of the section being generally indicated by the line 2—2 of FIGURE 1.

FIGURE 3 is a sectional view through one of the vanes separating the intake port and the exhaust port, the position of the section being indicated by the line 3—3 of FIGURE 1.

FIGURE 4 is a fragmentary sectional view through a portion of the housing of the rotor, the position of the section being indicated by the line 4—4 of FIGURE 1.

Figure 1:
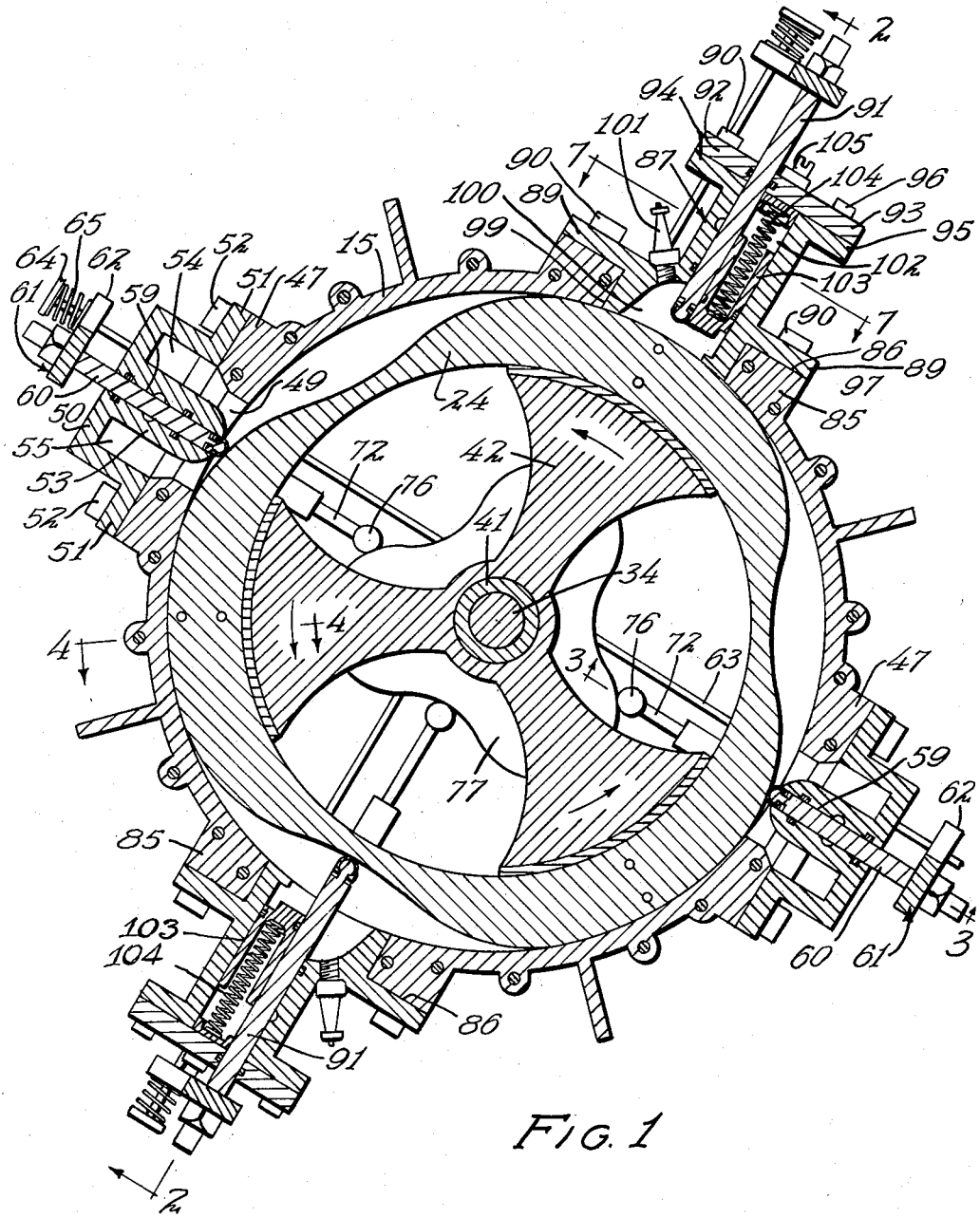
FIGURE 1 is a horizontal sectional view through the engine showing the general arrangement of parts therein.

As is perhaps best illustrated in FIGURES 2, 3, and 4 of the drawings, the engine housing which is indicated in general by the numeral 10 includes a generally cup shaped bottom section 11, and an inverted cup shaped upper section 12. The bottom section 11 includes an upwardly extending peripheral wall 13 which is connected by an offset 14 to an upwardly extending peripheral flange 15 which is of slightly greater internal diameter than the wall 13. The upper section 12 includes a disklike prop plate 16 which is provided with a downwardly extending peripheral wall 17 terminating at its lower end in an outwardly extending peripheral flange 19. The flange 19 overlies the upper edge of the cylindrical flange 15, and the two flanges are connected together by suitable means such as by the cap screws 20.

A short inwardly extending flange 21 is aligned with the offset 14, and a parallel short inwardly extending flange 22 forms an inward extension of the flange 19. The inner opposed surfaces of the flanges 21 and 22, together with the inner surface 23 of the flange 15 form a ring-shaped cavity designed to accommodate the outer periphery of the lobed ring 24 which, as will be later described, forms a part of the rotor 25. The upper closure plate 16 of the upper section 12 is centrally apertured as indicated at 26, providing communication with and axially recess 27 in the upper surface of the upper closure plate 16 which is designed to accommodate a bearing 29. The closure plate 30 of the lower section 11 is similarly axially apertured as indicated at 31, and an axial cavity 32 in the upper surface of the plate 30 is designed to accommodate a bearing 33. The bearings 29 and 33 are designed to support a vertical rotor shaft 34 and the lower end of the shaft 34 may extend through the bottom of the housing to act as a drive shaft for the load. In the arrangement illustrated, a distributor cap 36 is mounted upon the upper closure plate 16, and a distributor shaft 37 extends through the cap 36 and is connected to the shaft 1 to drive the distributor so that the various sparkplugs will be fired in proper order. The rotor shaft 34 is likewise shown provided with a gear 39 capable of driving an oil pump. Due to the fact that the distributors and oil pumps are well known in the art, they are not specifically shown in the drawings. An engine housing vent 40 is provided in the plate 16 to prevent a build up of pressure within the engine housing.

The rotor 25 includes a hub 41 mounted on the drive shaft 34 and which supports a series of angularly spaced spokes 42 having arcuate mounting plates 43 at their outer ends. The lobed ring 24 is secured to the mounting plates 43 by suitable bolts or other securing means 44. The lobed ring 24 may include a gentrally cylindrical upwardly extending ring 45 which supports a starter ring gear 46 which is engageable with a cooperable gear on a starter motor, not illustrated in the drawing.

Figures 5, 6:
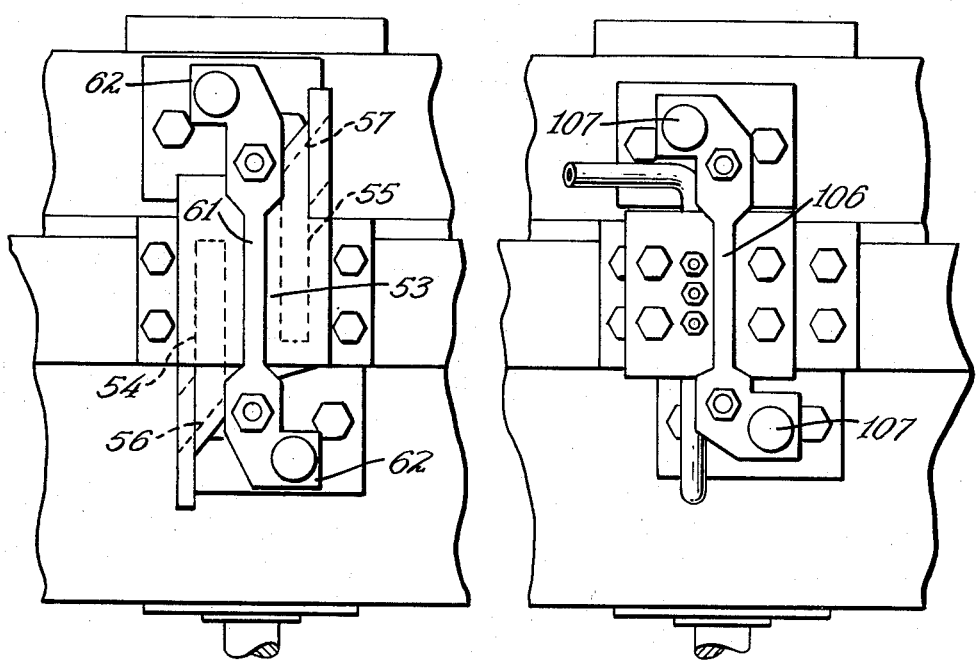
FIGURE 5 is an end elevational view of the portion of the motor including the intake and exhaust ports.
FIGURE 6 is a fragmentary elevational view of the portion of the motor encompassing the compression chamber.
Figure 7:
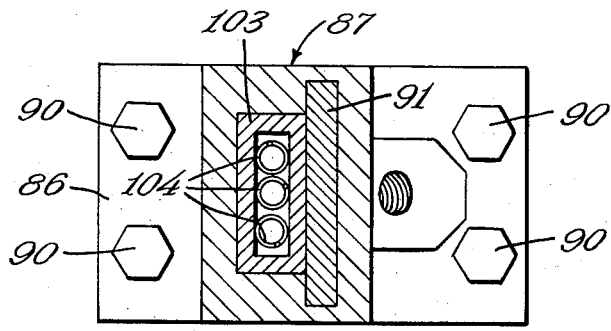
FIGURE 7 is a sectional view through a portion of the structure adjoining the compression chamber, the position of the section being indicated by the line 7—7 of FIGURE 1.
Figure 8:
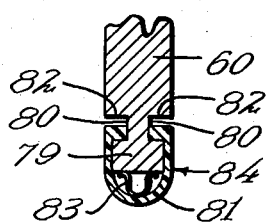
FIGURE 8 is an enlarged sectional view showing a sealing member for sealing one of the radially slidable vanes with respect to the rotor.

In reference now to FIGURE 1 of the drawings, it will be noted that the housing flange 15 is provided with a pair of diametrically opposed outwardly extending bosses 47, and a radially extending aperture 49 extends through the flange 15 at the center of each boss 47. A cap 50 overlies the outer end of each opening 49 and is provided with outwardly extending flanges 51 which are bolted or otherwise secured to the corresponding boss 47 by cap screws 52 or other similar means. A partition member 53 extends inwardly from the outer end of the boss 50 in a radial direction, the partition extending in a generally radial direction with respect to the rotor axis. The partition 53 acts to divide the opening 49 and the cap 50 into an exhaust manifold chamber 54, and an intake manifold chamber 55. As is indicated in FIGURE 5 of the drawings, the exhaust manifold 53 leads to an outlet port 56 which is connected to an exhaust pipe or external exhaust manifold. The intake chamber or manifold 55 is connected to an intake port 57 which is connected by suitable means to a source of fuel supply.

The partition 53 is provided with a central slot or passage 59 which supports a generally rectangular slidable vane 60. The vanes 60 in the two diametrically opposed slots 59 are provided at their outer ends with plates 61 which overlie the outer ends of the two vanes. As is perhaps best indicated in FIGURE 5 of the drawings, the plates 61 extend substantially beyond the width of the vanes 60 and are provided with angularly turned ends 62 which extend in opposite directions from the vanes. The angularly turned ends 62 of one plate 61 is connected to the opposed angularly turned end 62 of the opposite or diametrically opposed plate 61 by a plate tension rod 63. The purpose of the angularly turned ends 62 is to permit the plate tension rods 63 to be spaced from a diametrical plane through the axis of the rotor shaft, and so that the rods 63 avoid contact with the drive shaft. By having one plate tension rod 63 on one side of the shaft, and a similar rod on the opposite side of the shaft, the force applied by the rods is centered with respect to the vanes 60.

The tension rods 63 are provided with enlarged bearing ends 64, one of which is shown in FIGURE 1, and springs 65 are interposed between these enlarged heads 64 and the outer surfaces 62. As a result, the two vanes 60 are connected through the resilience of the springs 65, and are urged under spring tension against the outer periphery of the lobed ring 24.

As is indicated in FIGURE 3 of the drawings, the plate tension rods 63 are slidable through generally radially extending bearings 69 mounted upon the mounting plates 70 and extending through suitable apertures in the peripheral walls 13 and 17 of the housing. Also supported by the plate 70 are generally radially extending bearings 71 which slidably support push rods 72 which are movable in a radial direction. The outer ends of the push rods 72 are engageable in adjustable sockets 73 having shanks which extend through the plates 62. The shanks 74 of the socket forming member 73 may be threaded, and the sockets may be held in adjusted relation by lock nuts 75. The inner ends of the push rods 72 are provided with cam followers 76 which may be provided with round ends, or may comprise cam rollers.

As is indicated in FIGURES 1 and 2 of the drawings, a three lobed cam 77 is mounted upon the drive shaft 34 on each side of the rotor 25. The cam 77 is arranged to generally follow the contour of the lobed ring 24 and the push rods may be adjusted to hold the vanes 60 slightly out of contact with the periphery of the lobed ring if it is desired to remove some of the friction of the vane against the periphery of the lobe. Due to the fact that the cams 77 are within the engine housing, these cams may be readily lubricated while the periphery of the lobed ring 24 is somewhat more difficult to lubricate. In the event the inward pressure of the vanes 60 against the outer periphery of the lobe is not excessive or is not deemed important, these push rods 72 and their intended function may be eliminated, as the engines will function without them.

While the cam 77 generally follows the contour of the ring shaped lobe 24, the radial distance between the high points and low points of the cam are somewhat greater than the difference between the high and low points of the lobe so that when the high points of the lobe and cam (the two being substantially aligned), the vanes 60 are retracted into the slots 59 and the inner ends of these vanes are somewhat spaced from the surface of the lobe. However, due to the fact that the partition 53 extends into close proximity with the surface of the lobe, no undesirable results are obtained.

The inner ends of the vanes 60 are provided with extremities 79 which are somewhat thinner than the thickness of the vanes, and opposed parallel grooves 80 are provided in opposite surfaces of the vanes 60 adjoining the portion 79 of reduced thickness. A generally U-shaped sealing member 81 encircles the extremity 69 of each vane, and the sealing member includes inwardly turned opposed flanges 82 which are slidable in the grooves 80. A spring 83 is interposed between the closed end of each sealing member nad the inner extremity 79 of the vane 60, the spring 83 tending urge the sealing member under spring tension against the surface of the lobe 24. This arrangement reduces the area of contact between the inner ends of the vanes and the lobe, and also permits greater power in the dimensions as the spring 83 may expand or contract to a degree necessary to hold the sealing member against the lobe. Where the push rods 63 are employed, the vanes may accordingly be held in spaced relation to the surface of the lobe, and the sealing members which are indicated in general by the numeral 84 may form the actual seal.

In right angular relation to the intake and outlet or exhaust ports, the flange 15 is provided with an additional pair of bosses 85 in diametrically opposed relation and having flat parallel outer surfaces 86. A compression chamber forming enclosure 87 is provided with opposed outwardly extending flanges 89 which are secured in face contact with the bosses 85 by bolts 90 or other suitable connecting means. A radially slidable generally rectangular vane 91 is slidably supported for movement in a radial direction in each enclosure 87, the vane extending between enclosure plates 92 and 93 which are bolted or otherwise secured to outgoing flanges 94 and 95, respectively, by bolts 96 or other suitable connecting means. The enclosure 87 is provided with an inwardly extending plug portion 97 which fits into radially extending apertures 99 extending through the bosses 85. The inner surface of the plug portion 97 extends on the cylindrical plane of the inner surface of the flange 15, and one side of this plug portion is provided with a cavity 100 which acts as an explosion chamber. A spark plug 101 is threaded through the enclosure 87 to extend into the explosion chamber 100.

The chamber 100 is on one side of the path of movement of the corresponding vane 991. The opposite side of the enclosure may be provided with a generally rectangular compression chamber 102 which slidably supports a correspondingly shaped slidable piston 103. Spring means 104 are interposed between the piston 103 and the enclosure plate 93, the springs being adjustable by said screws 105. The piston 103 is provided with a hollow cavity into which the springs 104 extend so that the length of the springs can be increased.

As is indicated in FIGURE 6 of the drawings, the outer end of each of the vanes 91 is secured to a compression power plate 106 having oppositely directed angularly turned ends 107. As is indicated in FIGURE 2 of the drawings, plate tension rods 109 (only one of which is shown due to the position of the section) extend through bushings 110 mounted upon mounting plates 111 and secured to the outer surface of the housing walls 13 and 17. The rods 109 comprise plate tension rods and extend through the angularly turned ends 107 of the plate 106 and are provided with enlarged ends 112. Springs 113 are interposed between these enlarged ends 112 and the outer surface of the plate 106 so as to provide some degree of resilience in the connection.

As is also indicated in FIGURE 2 of the drawings, push rods 114 extend through radially extending bushings or bearings 115 on the mounting plates 111 and extend through the housing walls. These push rods are provided with rounded cam engaging ends 116 which may, if desired, comprise cam rollers. The members 116 are engageable with the cams 77 in the same manner as the previously described push rods 72. The outer ends of the push rods 114 are engaged in socket forming members 117 having shanks 119 which may be threaded through the ends of the plates 106 and which are held in adjusted position with respect to the plates by the lock nuts 120.

The inner ends of the vanes 91 are provided with sealing rings of the type previously described and identified by the numeral 84 to form a seal with the piston lobes. The cams 77 act upon the vanes 91 in the same manner as they act upon the vanes 60 when the push rods 72 are employed. The cams 77 may hold the vanes 91 in closely spaced relation to the periphery of the lobe during the major portion of the cycle of movement. However the lobes of the cam, being of somewhat greater length than the lobes of the ring 24 act to disengage the inner ends of the vanes 91 from the surface of the lobes at a predetermined point in the cycle of operation, for a purpose which will be later described in more detail.

In the operation of the apparatus, a mixture of fuel and air is drawn into each of the pockets between the lobes of the lobed ring 24 from the intake chamber 55 due to the partial vacuum created by movement of the previous lobe. The mixture is carried in the pocket between the lobes until the lobe opens the compression chamber. As the vane 91 forms a seal between the lobe and the chamber 102, the fuel is compressed in the chamber 102, retracting the piston 103 to provide the necessary space. Just before the periphery of the rotor lobe closes the firing chamber 100, the cam 77 acts to force the vane 91 outwardly, providing communication between the compression chamber 102 and the firing chamber 100. In view of the fact that the power lobe has not completely closed the firing chamber 100, a certain amount of previously burned gases expelled ahead of the power lobe to be carried to the exhaust chamber 54. As a result, the force of the fuel entering the firing chamber tends to scavenge the burnt gases from the firing chamber to some extent just before this chamber is sealed by the power lobe.

Just before the power lobe of the lobed ring 24 starts to open the compression and firing chamber, the cam 77 releases the vane 91 and moves the vane or its end seal into contact with the lobe. By this time, the springs 104 have projected the piston 103 while forcing the gases into the firing chamber 100. Shortly after the lobe passes the firing chamber, the gases are exploded by the sparkplug 101. The gases forced by the explosion cannot move in a direction rearwardly of the direction of rotation because of the vane 91 and accordingly, the force of the explosion is exerted against the power lobe which is just past the firing chamber. The expansion of the exploding gases as a result tends to rotate the power lobe. Simultaneously, fuel is being delivered to the compression chamber 102 on the opposite side of the vane 91 thus completing the cycle of operation. The spent gases are carried by the pockets in the lobed ring 24 to the exhaust port 54 from which they are free to escape. Simultaneously, fuel is being drawn into the pocket in the lobe from the intake chamber 55.

It will be seen that the device is extremely simple, requiring neither intake or exhaust valves, and the action is smooth in view of the fact that the fuel is being simultaneously exploded on opposite sides of the rotor to act upon the rotor and to drive it in the proper direction. In view of the fact that the cam 77 is mounted upon the drive shaft of the apparatus, no timing problem is involved. The shape of the lobed ring 24 may be varied to some extent to provide the desired operating characteristics.

While the engine described has been shown to be an internal combustion engine of the type employing a sparkplug in the firing chamber to ignite the fuel, the apparatus could similarly function as a diesel engine. Rotation of the rotor will force the fuel into the compression chamber 102 with sufficient force to retract the springs 104. In FIGURE 1 of the drawings, both of the pistons 103 are in partially retracted position, the piston 103 at the upper right of the figure moving downwardly against the rotor in the position illustrated and the piston 103 at the lower left of the figure being moved outwardly by the compressed fuel. When the vane 91 moves into the open position shown at the upper right of the figure, the piston 103 forces the fuel into the firing chamber 100, the vane 91 then moves downwardly against the lobe with sufficient compressive force to explode the fuel. Thus the motor might be a diesel motor and the sparkplugs or fuel igniting means may be eliminated.

In accordance with the patent statutes, we have described the principles of construction and operation of our improvement in Rotary Engine, and while we have endeavored to set forth the best embodiment thereof, we desire to have it understood that changes may be made within the scope of the following claims without departing from the spirit of our invention.

We claim:
1. A rotary engine including a housing having a cylindrical inner surface, a lobed rotor rotatably supported in said housing in concentric relation to said surface, a vane slidably supported by said housing and having an inner end engaging the surface of said rotor, said housing including an exhaust port on one side of said vane and an intake port on the other side thereof, said housing including a chamber in its inner surface, a second vane slidably supported in said housing and having an inner end engaging the surface of said rotor, said second vane dividing said chamber to form a compression chamber on one side of said second vane and a firing chamber on the other side thereof, fuel igniting means in said firing chamber, means normally urging said vanes against said rotor, and means operable upon rotation of said rotor to retract said second vane at a predetermined point in the rotation of said rotor to provide communication between said compression chamber and said firing chamber.

2. The structure of claim 1 and in which said compression chamber is expandable under pressure.

3. The construction of claim 1 and including a cam in said housing concentric with said rotor and in which said means operable to retract said second vane includes means actuated by said cam.

4. The structure of claim 1 and including movable sealing means on the inner ends of said vanes.

5. A rotary engine including a housing having a cylindrical inner surface, a lobed rotor rotatably supported in said housing in concentric relation to said surface, a vane slidably supported by said housing and having an inner end engaging the surface of said rotor, said housing including an exhaust port on one side of said vane and an intake port on the other side thereof, said housing including a chamber in its inner surface, a second vane slidably supported in said housing and having an inner end engaging the surface of said rotor, said second vane dividing said chamber to provide a compression chamber on one side of said second vane and a firing chamber on the other side thereof, fuel igniting means in said firing chamber, means normally urging said vanes against said rotor, and means operable upon rotation of said rotor to retract said second vane at a predetermined point in the rotation of said rotor to provide communication between said compression chamber and said firing chamber, said compression chamber including a slidable piston movable between projected and retracted positions, and resilient means urging said piston toward projected position, said lobed rotor acting to urge fuel into said compression chamber and to retract said piston.

6. The construction of claim 5 and including a cam in said housing concentric with said rotor, and in which said means operable to retract said second vane includes means actuated by said cam.

7. A rotary engine including a housing having a substantially cylindrical inner surface, a rotor rotatably supported in said housing concentric with said cylindrical surface, said rotor having a plurality of spaced rotor lobes, a first pair of vanes slidably supported by said housing and having inner ends engaging said rotor said housing having exhaust ports on one side of said vanes and intake ports on the other sides thereof, means connecting said vanes for normally sliding said vanes in unison, resilient means in said connecting means inactive during the major portion of the cycle, a second pair of vanes in angularly spaced relation to said first pair and slidably supported by said housing, said second vanes having inner ends engageable with said rotor, said housing including a compression chamber forwardly of each said vane in the direction of rotation of said rotor and a firing chamber on the other side thereof, fuel igniting means in said firing chamber, said compression chambers including projectable and retractable pistons, means urging said pistons toward projected position to reduce the volume of said compression chambers, and means engageable with said second vanes to flex said resilient means and to retract each second vane at a predetermined point in the rotation of said rotor to provide communication between said compression and firing chambers.

8. The structure of claim 7 and including means resiliently connecting said second vanes for slidable movement thereof in unison.

9. The structure of claim 7 and in which said rotor includes three lobes in equally spaced relation.

10. The structure of claim 9 and in which said first vanes are spaced at substantially ninety degrees from said second vanes.

11. A rotary engine including a housing having a substantially cylindrical inner surface, a rotor having three lobes equally spaced and rotatably supported within said housing substantially concentric with said inner surface, the periphery of said lobes, fitting snugly within said inner surface, a pair of first vanes slidably supported by said housing for radial movement in diametrically opposed relation, said housing including exhaust ports forwardly of said first vanes in the direction of rotation of said rotor and including intake ports on the other sides thereof, said housing including a pair of diametrically opposed chambers in its inner surface, a pair of second vanes slidably supported by said housing for radial movement in diametrically opposed relation and angularly spaced from said first vanes, said second vanes intersecting said chambers to provide a compression chamber forwardly of each said second vane in the direction of rotation of said rotor and a firing chamber on the other side thereof, fuel igniting means in each said firing chamber, means connecting said vanes of said first pair for movement in unison, means resiliently connecting said vanes of said second pair for movement in unison and means for providing communication between each said compression chamber and the corresponding said firing chamber at one point in the rotation of said rotor when said resilient connecting means is flexed.

12. The structure of claim 11 and in which each said compression chamber includes a retractable and projectable piston to vary the volume of the compression chamber and including resilient means for urging each said piston toward projected position to reduce the volume of compression chambers.

13. The structure of claim 11 and in which the means connecting the vanes of each pair includes a pair of rods connected to the outer ends of the vanes and extending generally parallel to the direction of movement of said vanes of each pair.

14. The structure of claim 11 and including a three lobed cam concentric with, and rotatable with, said rotor, and in which the means providing communication between each said compression chamber and the corresponding said firing chamber includes slidably supported push rod means engageable with said second vanes and actuated by said cam.

15. The structure of claim 11 and including a pair of three lobed cams mounted on opposite sides of said rotor and rotatable therewith, and slidable means actuated by said cams and engageable with said second vanes to retract the same, said slidable means and cams forming the means for providing communication between said compression and firing chambers.

16. A rotary engine including a housing having a cylindrical inner surface, a lobed rotor rotatably supported in said housing in concentric relation to said surface, a vane slidably supported by said housing and having an inner end engaging the surface of said rotor, said housing including an exhaust port on one side of said vane and an intake port on the other side thereof, said housing including a chamber in its inner surface, a second vane slidably supported in said housing and having an inner end engaging the surface of said rotor, said second vane dividing said chamber to provide a compression chamber on one side of said second vane and a firing chamber on the other side thereof, means normally urging said vanes against said rotor, and means operable upon rotation of said rotor to retract said second vane at a predetermined point in the rotation of said rotor to provide communication between said compression chamber and said firing chamber.

References Cited in the file of this patent

UNITED STATES PATENTS

| | | |
|---|---|---|
| 1,307,282 | Ward | June 17, 1919 |
| 2,421,898 | Melrose | June 10, 1947 |

FOREIGN PATENTS

| | | |
|---|---|---|
| 583,705 | France | Nov. 5, 1924 |
| 694,369 | France | Sept. 15, 1930 |
| 1,124,477 | France | July 2, 1956 |
| 392,441 | Great Britain | May 18, 1933 |